United States Patent
Melik-Barkhudarov et al.

(10) Patent No.: US 10,654,453 B2
(45) Date of Patent: May 19, 2020

(54) SYSTEMS AND METHODS FOR LOW-LATENCY BRAKING ACTION FOR AN AUTONOMOUS VEHICLE

(71) Applicant: UATC, LLC, San Francisco, CA (US)

(72) Inventors: Narek Melik-Barkhudarov, Pittsburgh, PA (US); Michael W. Bode, Pittsburgh, PA (US); Randy Warner, Allison Park, PA (US); Dillon Collins, Pittsburgh, PA (US); Anurag Kumar, Pittsburgh, PA (US); Carl Knox Wellington, Pittsburgh, PA (US)

(73) Assignee: UATC LLC, San Francisco, CA (US)

( * ) Notice: Subject to any disclaimer, the term of this patent is extended or adjusted under 35 U.S.C. 154(b) by 109 days.

(21) Appl. No.: 15/784,684

(22) Filed: Oct. 16, 2017

(65) Prior Publication Data
US 2019/0061712 A1   Feb. 28, 2019

Related U.S. Application Data

(60) Provisional application No. 62/549,355, filed on Aug. 23, 2017.

(51) Int. Cl.
| | |
|---|---|
| B60T 7/00 | (2006.01) |
| B60T 7/22 | (2006.01) |
| G08G 1/16 | (2006.01) |
| B60T 8/172 | (2006.01) |
| B60T 7/16 | (2006.01) |
| B60W 30/08 | (2012.01) |

(52) U.S. Cl.
CPC ............... *B60T 7/22* (2013.01); *B60T 7/16* (2013.01); *B60T 8/172* (2013.01); *B60W 30/08* (2013.01); *G08G 1/166* (2013.01); *B60T 2201/022* (2013.01); *B60T 2210/32* (2013.01)

(58) Field of Classification Search
None
See application file for complete search history.

(56) References Cited

U.S. PATENT DOCUMENTS

| | | | | |
|---|---|---|---|---|
| 9,212,926 B2* | 12/2015 | Attard | ..................... | G01C 21/36 |
| 9,771,055 B1* | 9/2017 | Zhang | ..................... | B60T 8/174 |
| 2003/0132666 A1* | 7/2003 | Bond, III | .................. | B60T 7/22 |
| | | | | 303/193 |

(Continued)

*Primary Examiner* — Truc M Do
(74) *Attorney, Agent, or Firm* — Dority & Manning, P.A.

(57) ABSTRACT

Systems and methods for implementing a low-latency braking action for an autonomous vehicle are provided. A computing system can include a vehicle autonomy system comprising one or more processors configured to determine a motion plan for an autonomous vehicle based at least in part on sensor data from one or more sensors of the autonomous vehicle. The computing system can further include a low-latency braking system comprising one or more processors configured to determine that the autonomous vehicle has a likelihood of colliding with an object in a surrounding environment based at least in part on a previously-determined motion plan obtained from the vehicle autonomy system. In response to determining that the autonomous vehicle has a likelihood of colliding with the object in the surrounding environment, the low-latency braking system can further be configured to implement a braking action for the autonomous vehicle.

18 Claims, 6 Drawing Sheets

(56) References Cited

U.S. PATENT DOCUMENTS

| | | | | |
|---|---|---|---|---|
| 2010/0006363 A1* | 1/2010 | Zagorski | B60T 7/22 180/275 |
| 2010/0094520 A1* | 4/2010 | Zagorski | B60T 7/22 701/70 |
| 2011/0015818 A1* | 1/2011 | Breuer | B60T 8/17558 701/31.4 |
| 2011/0288774 A1* | 11/2011 | Bengtsson | G08G 1/16 701/301 |
| 2012/0203436 A1* | 8/2012 | Braennstroem | B60T 7/22 701/70 |
| 2012/0283927 A1* | 11/2012 | Reinisch | B60T 7/22 701/70 |
| 2014/0032093 A1* | 1/2014 | Mills | B60W 40/107 701/301 |
| 2015/0151725 A1* | 6/2015 | Clarke | B60W 30/00 701/28 |
| 2015/0166059 A1* | 6/2015 | Ko | B60W 30/09 701/28 |
| 2015/0206431 A1* | 7/2015 | Park | G08G 1/0962 701/1 |
| 2015/0210280 A1* | 7/2015 | Agnew | B60W 30/09 701/48 |
| 2015/0229885 A1* | 8/2015 | Offenhaeuser | B60W 30/09 348/78 |
| 2015/0336547 A1* | 11/2015 | Dagan | B60T 7/22 701/70 |
| 2015/0336575 A1* | 11/2015 | Zeng | B62D 15/0265 701/41 |
| 2016/0167519 A1* | 6/2016 | Luke | B60L 3/0015 |
| 2016/0272172 A1* | 9/2016 | Lee | B60T 7/22 |
| 2016/0339959 A1* | 11/2016 | Lee | B62D 15/0265 |
| 2017/0120803 A1* | 5/2017 | Kentley | B60Q 1/26 |
| 2017/0168485 A1* | 6/2017 | Berntorp | B60W 30/00 |

* cited by examiner

SYSTEMS AND METHODS FOR LOW-LATENCY BRAKING ACTION FOR AN AUTONOMOUS VEHICLE

FIELD

The present disclosure relates generally to autonomous vehicles. More particularly, the present disclosure relates to systems and methods for implementing a low-latency braking action for an autonomous vehicle in response to determining an object has a likelihood of colliding with the autonomous vehicle.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include a vehicle autonomy system comprising one or more processors. The vehicle autonomy system can be configured to determine a motion plan for an autonomous vehicle based at least in part on sensor data from one or more sensors of the autonomous vehicle. The computing system can further include a low-latency braking system comprising one or more processors. The low-latency braking system can be configured to determine that the autonomous vehicle has a likelihood of colliding with an object in a surrounding environment based at least in part on a previously-determined motion plan obtained from the vehicle autonomy system. In response to determining that the autonomous vehicle has a likelihood of colliding with the object in the surrounding environment, the low-latency braking system can further be configured to implement a braking action for the autonomous vehicle.

Another example aspect of the present disclosure is directed to a computer-implemented method. The computer-implemented method can include obtaining, by a computing system comprising one or more processors, state data descriptive of one or more objects perceived by an autonomous vehicle from a vehicle autonomy system of the autonomous vehicle. The computer-implemented method can further include obtaining, by the computing system, a previously-determined motion plan for the autonomous vehicle for a forthcoming time period from the vehicle autonomy system of the autonomous vehicle. The computer-implemented method can further include determining, by the computing system, that the autonomous vehicle has a likelihood of colliding with an object in the one or more objects perceived by the autonomous vehicle based at least in part on the previously-determined motion plan and the respective state data descriptive of the object. The computer-implemented method can further include, in response to determining that the autonomous vehicle has a likelihood of colliding with the object, implementing, by the computing system, a braking action to reduce the likelihood that the autonomous vehicle will collide with the object.

Another example aspect of the present disclosure is directed to an autonomous vehicle. The autonomous vehicle can include a vehicle autonomy system comprising one or more processors. The vehicle autonomy system can be configured to determine a motion plan for an autonomous vehicle based at least in part on sensor data from one or more sensors of the autonomous vehicle. The autonomous vehicle can further include a low-latency braking system comprising one or more processors. The low-latency braking system can be configured to determine that the autonomous vehicle has a likelihood of colliding with an object in a surrounding environment based at least in part on a previously-determined motion plan obtained from the vehicle autonomy system. In response to determining that the autonomous vehicle has a likelihood of colliding with the object in the surrounding environment, the low-latency braking system can further be configured to implement a braking action for the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
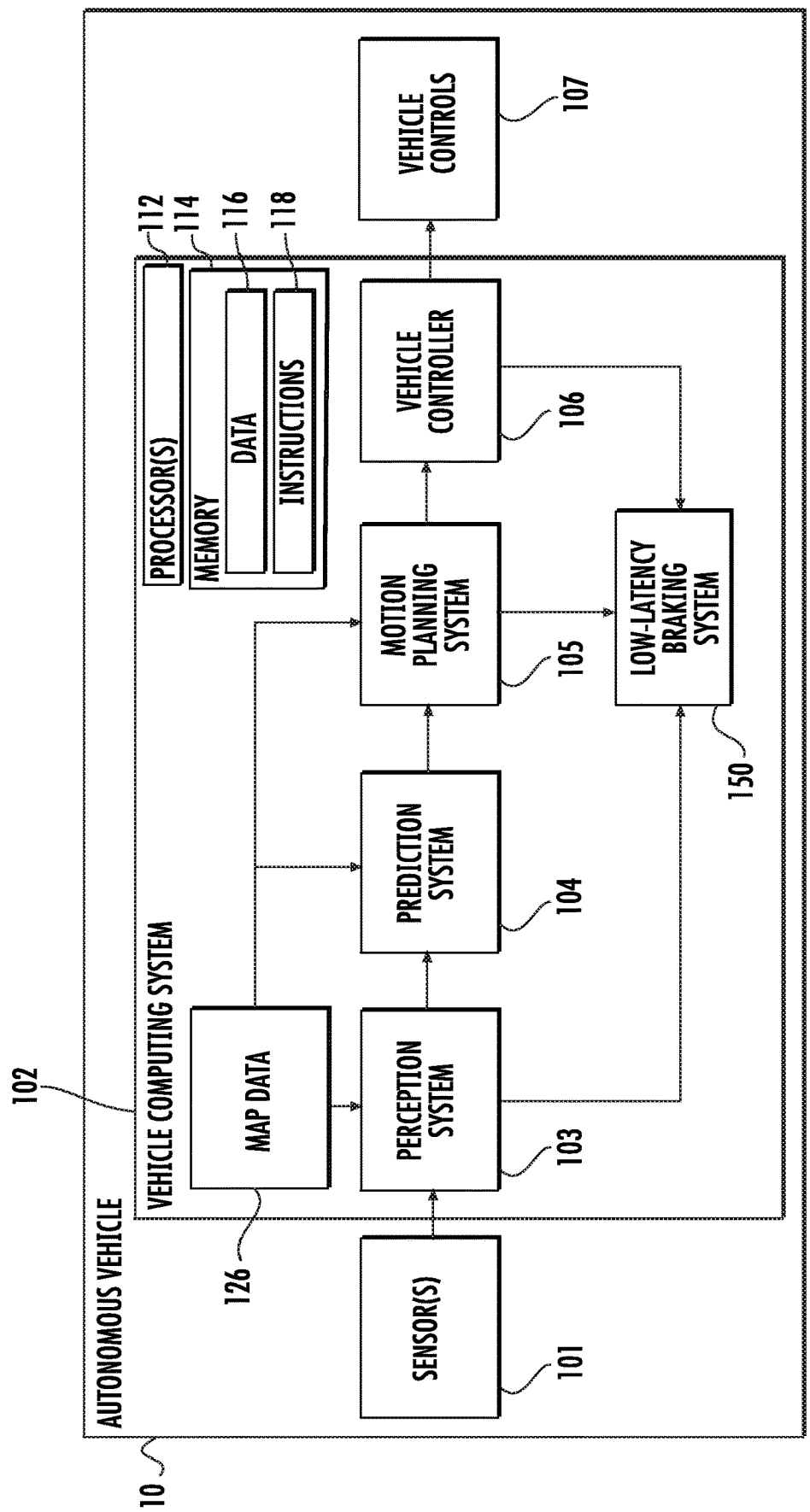
FIG. 1 depicts a block diagram of an example autonomous vehicle according to example aspects of the present disclosure.

Example aspects of the present disclosure are directed to systems and methods for a implementing a low-latency braking action for an autonomous vehicle in response to determining that the autonomous vehicle has a likelihood of colliding with an object. In particular, an autonomous vehicle can include or otherwise use a vehicle autonomy system to obtain information about objects within a surrounding environment of the autonomous vehicle from one or more sensors and determine a motion plan for the autonomous vehicle based at least in part on the sensor data. For example, the vehicle autonomy system can obtain sensor data, analyze the sensor data using one or more subsystems, and determine a motion plan for the autonomous vehicle based on the analyzed sensor data.

According to example aspects of the present disclosure, the autonomous vehicle can further include or otherwise use a low-latency braking system configured to determine whether the autonomous vehicle has a likelihood of colliding with an object based at least in part on a previously-determined motion plan obtained from the vehicle autonomy system. The low-latency braking system can further be configured to implement a braking action to reduce the likelihood of the autonomous vehicle colliding with the object when an object is determined to be likely to collide with the autonomous vehicle.

As one example, the low-latency braking system can obtain state data descriptive of the one or more objects in the surrounding environment from a perception system of the vehicle autonomy system (e.g., data descriptive of a position, distance, velocity, and heading of the one or more objects) and a previously-determined motion plan from a motion planning system of the vehicle autonomy system. The low-latency braking system can then perform a safety check to determine whether any of the objects perceived by the perception system are likely to collide with the autonomous vehicle based on the state data for the objects and the motion plan. If the autonomous vehicle is determined to be likely to collide with any of the objects, the low-latency braking system can be configured to implement a braking action for the autonomous vehicle. For example, in some implementations, the low-latency braking system can reduce the velocity of the autonomous vehicle or bring the autonomous vehicle to a complete stop.

In such fashion, the low-latency braking system can use data obtained and generated by the vehicle autonomy system in order to quickly perform a supplemental safety check in order to brake in response to determining the autonomous vehicle has a likelihood of colliding with an object. This can reduce the reaction time of the autonomous vehicle to such objects, thereby enhancing passenger and vehicle safety.

More particularly, in some implementations, an autonomous vehicle can include a computing system that assists in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the computing system can include a vehicle autonomy system which includes one or more subsystems. For example, the vehicle autonomy system can include a perception system, a prediction system, and a motion planning system that cooperate to perceive the surrounding environment of the autonomous vehicle and determine a motion plan for controlling the motion of the autonomous vehicle accordingly.

For example, one or more sensors of the autonomous vehicle can obtain sensor data associated with one or more objects within the surrounding environment of the autonomous vehicle. In some implementations, the perception system can receive the sensor data and generate state data descriptive of the one or more objects, such as data describing the position, velocity, heading, acceleration, size, type, etc. for each object.

The perception system can provide the state data indicative of the one or more objects to the prediction system, which can determine a predicted future state (e.g., a predicted trajectory) for each object perceived by the perception system. For example, the prediction system can create prediction data associated with each respective object within the surrounding environment. The prediction data can be indicative of one or more predicted future locations of each respective object. The prediction data can be indicative of a predicted trajectory (e.g., a predicted path) of each object within the surrounding environment of the autonomous vehicle. For example, the predicted trajectory (e.g., path) can indicate a path along with the respective object is predicted to travel over time (and/or the speed at which the object is predicted to travel along the predicted trajectory). In some implementations, the prediction system can determine a plurality of candidate trajectories, and select a predicted trajectory from the plurality of candidate trajectories. The prediction system can provide the predicted trajectory for the one or more objects to the motion planning system.

The motion planning system can determine a motion plan for the autonomous vehicle based on the predicted trajectories for the objects. For example, the motion planning system can determine the motion plan for the autonomous vehicle to navigate around and/or in response to the perceived objects and their predicted trajectories. The motion planning system can then provide the motion plan to a vehicle controller. The vehicle controller can control the motion of the autonomous vehicle based on the motion plan. In this way, the vehicle autonomy system can perceive objects within a surrounding environment of an autonomous vehicle, and, in response, control the autonomous vehicle accordingly.

In some implementations, the vehicle autonomy system can perform each of the sensing, perception, prediction, motion planning, and control steps sequentially using data obtained in a plurality of consecutive time frames. For example, in an initial time frame, sensor data associated with the one or more objects within the surrounding environment of the autonomous vehicle can be obtained from one or more sensors on the autonomous vehicle. In a subsequent time frame, the sensor data can be analyzed by the perception system to generate state data descriptive of the one or more objects. In a still subsequent time frame, the prediction system can predict a trajectory for each of the objects perceived by the perception system. In yet another subsequent time frame, the motion planning system can determine a motion plan for the autonomous vehicle based at least in part on the predicted trajectories of the one or more objects. In yet another subsequent time frame, the vehicle controller can control the autonomous vehicle according to the motion plan. Additionally, as new sensor data is acquired for each consecutive time frame, each system can iteratively perform its respective function. Thus, the autonomous vehicle can iteratively update and implement the motion plan for the autonomous vehicle at each consecutive time frame.

However, in such an implementation, each of the sensing, perception, prediction, motion planning, and vehicle control systems may require the preceding system to complete a respective analysis of data for a time frame before each system can subsequently analyze the data for the time frame. For example, for each consecutive time frame, the perception system may need to complete an analysis of data obtained from one or more sensors of the autonomous vehicle in order to generate the state data used by the prediction system. Similarly, the prediction system may need to complete an analysis of state data for a time frame to determine a predicted trajectory for each object before the motion planning system can determine a motion plan for the autonomous vehicle. Thus, the overall time from when an object is sensed by a sensor until the autonomous vehicle is controlled in response to the object may be dependent upon each subsystem in a vehicle autonomy system completing its respective function in a consecutive manner.

In contrast, the systems and methods according to example aspects of the present disclosure can allow for a low-latency braking action to be implemented when the autonomous vehicle is determined to be likely to collide with an object, thereby enabling quicker response times to such objects than provided by such a vehicle autonomy system. For example, the systems and methods of the present disclosure can allow for certain analysis functions of the vehicle autonomy system to be omitted in making such a determination. For example, in some implementations, the low-latency braking system can implement a braking action without classifying the object (e.g. determining whether the object is a pedestrian, bicycle, automobile, etc.) or predicting a trajectory of the object. This can allow for the low-latency braking system to respond to such objects more quickly than the vehicle autonomy system.

Further, the systems and methods according to example aspects of the present disclosure can be performed in parallel with a vehicle autonomy system, thereby providing a supplementary safety check. This can further increase passenger and vehicle safety.

According to example aspects of the present disclosure, a low-latency braking system can be implemented by a computing system, such as a computing system configured to implement a vehicle autonomy system. The low-latency braking system can be configured to obtain data associated with one or more objects that are within a surrounding environment of the autonomous vehicle. The low-latency braking system can further be configured to obtain a previously-determined motion plan for the autonomous vehicle for a forthcoming time period from the vehicle autonomy system. For example, the low-latency braking system can be configured to obtain a previously-determined motion plan from a motion planning system of the vehicle autonomy system. In some implementations, the previously-determined motion plan can be the most recently determined motion plan. The low-latency braking system can further determine whether an object in the one or more objects has a likelihood of colliding with the autonomous vehicle based at least in part on the motion plan. When an object in the one or more objects is determined to be likely to collide with the autonomous vehicle, the low-latency braking system can implement a braking action to reduce the likelihood that the autonomous vehicle collide with the object.

In some implementations, the low-latency braking system can obtain data associated with the one or more objects that are within the surrounding environment of the autonomous vehicle by obtaining state data descriptive of the one or more objects from the perception system of the autonomous vehicle. In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle. In some implementations, the sensor data can be obtained at a plurality of consecutive time frames. Based on sensor data received from the one or more sensors and/or map data, the perception system can identify one or more objects that are proximate to the autonomous vehicle at each time frame. As an example, in some implementations, the perception system can segment the sensor data (e.g., the LIDAR data) into discrete object polygons and/or track objects frame-to-frame (e.g., iteratively over a number of consecutive time frames or periods).

In particular, in some implementations, the perception system can generate, for each object, state data that describes a current state of such object. As examples, the state data for each object can describe an estimate of the object's: location (also referred to as position); speed (also referred to as velocity); acceleration, heading; yaw rate, orientation; size/footprint (e.g., as represented by a bounding polygon or other shape); type/class (e.g., vehicle, pedestrian, bicycle); distance from the autonomous vehicle, and/or other state information and/or covariances of the above-described forms of state information. The perception system can provide the state data to the low-latency braking system when the state data is provided to the prediction system (e.g., iteratively for each time frame). In some implementations, the low-latency braking system can obtain a subset of state data generated by the perception system, such as state data indicative of a location, speed, and heading.

In some implementations, the low-latency braking system can be configured to obtain data associated with one or more objects within the surrounding environment by obtaining sensor data from one or more sensors of the autonomous vehicle. In such a configuration, the low-latency braking system can then be configured to perform similar analysis as the perception system on the sensor data in order to generate state data for the one or more objects within the surrounding environment of the autonomous vehicle. In some implementations, the low-latency braking system can be configured to determine particular state data for each object, such as, for example, state data indicative of a position, speed, and heading. The low-latency braking system can be configured to determine whether an object has a likelihood of colliding with the autonomous vehicle based at least in part on the motion plan and the data associated with the one or more objects. For example, low-latency braking system can obtain the most recently generated motion plan for the autonomous vehicle from the motion planning system of the vehicle autonomy system. The low-latency braking system can then determine whether an object has a likelihood of colliding with the autonomous vehicle based at least in part on the motion plan and data associated with the object without predicting a trajectory of the object in the surrounding environment (e.g. by the prediction system). For example, the low-latency braking system can be configured to determine that an object has a likelihood of colliding with the autonomous vehicle based on a motion plan for the autonomous vehicle and a current position, heading, and velocity of the object.

For example, in some implementations, the low-latency braking system can be configured to determine whether an object is within a path of the motion plan of the autonomous vehicle for the forthcoming time frame. For example, the low-latency braking system can map out a path to be traversed by the autonomous vehicle over a forthcoming time period based on the motion plan. The low-latency braking system can then determine whether a particular object is within the path of the motion plan based on a position of the object. For example, state data descriptive of the object can include data descriptive of the object's position, which can be mapped onto the path of the motion plan. If the object is within the path of the motion plan, in some implementations, additional analysis can be performed on the object. If, however, the object is not within the path of the motion plan, in some implementations, the object can be disregarded.

In some implementations, the low-latency braking system can be configured to determine that an object is within the path of the motion plan of an autonomous vehicle without first classifying the object. For example, in some implementations, the low-latency braking system can be configured to obtain state data descriptive of the object's position from the perception system without waiting for the perception system to classify the object (e.g., as a pedestrian, automobile, bicycle, etc.). Similarly, in some implementations, the low-latency braking system can determine state data descriptive of the object's position based on sensor data without classifying the object. This can further reduce the overall latency in responding to the object by reducing the computational analysis required to make a determination that the autonomous vehicle has a likelihood of colliding with the object.

In some implementations, each object in the one or more objects that is within the path of the motion plan can be selected for additional analysis by the low-latency braking system. For example, for each object within the path of the motion plan, the low-latency braking system can determine a longitudinal velocity component for the object along the path of the motion plan. As used herein, the term "longitudinal velocity component" refers to a velocity component of an object that corresponds to a planned direction of travel of an autonomous vehicle according to a motion plan for the autonomous vehicle. For example, the state data descriptive of each object can include data descriptive of a velocity and/or heading of the object. In some implementations, the velocity of an object can be represented as a vector including both a magnitude and a direction (i.e., a heading). In some implementations, the magnitude of the velocity and the heading of the object can be represented as separate quantities. In some implementations, the low-latency braking system can be configured to determine a longitudinal velocity component for the object along the motion path by, for example, by performing a vector analysis on the state data for the object to determine a magnitude of the velocity component in the planned direction of travel of the autonomous vehicle. In other implementations, the low-latency braking system can be configured to determine a longitudinal velocity component for an object using any suitable means.

In some implementations, the low-latency braking system can be configured to determine a region of interest based on the longitudinal velocity component for an object and the velocity of the autonomous vehicle. For example, the region of interest for an object can correspond to a portion of a motion plan for the autonomous vehicle in which the object and the autonomous vehicle are projected to overlap with one another (e.g., collide) based on their respective velocities. The region of interest can be, for example, the area of the motion plan in which the object and the autonomous vehicle are projected to occupy at the same time.

For example, an object traveling in the same direction as the path of the motion plan of an autonomous vehicle at a velocity greater than or equal to the velocity of the autonomous vehicle will have a non-existent region of interest, as the object and the autonomous vehicle will not be projected to occupy the same area at the same time. Conversely, an object traveling in the same direction as the path of the motion plan of the autonomous vehicle at a velocity less than the velocity of the autonomous vehicle will have a region of interest corresponding to a portion of the path of the motion plan in which the object and the autonomous vehicle are projected to overlap.

In some implementations, the low-latency braking system can be configured to determine a respective region of interest for each object within the path of the motion plan of the autonomous vehicle. For example, the low-latency braking system may determine that pluralities of objects are located within the path of the motion plan of the autonomous vehicle. The low-latency braking system can be configured to determine a respective region of interest for each object in the plurality of objects within the path of the motion plan.

In some implementations, the low-latency braking system can be configured to determine that an object has a likelihood of colliding with the autonomous vehicle when a distance from the autonomous vehicle to the respective region of interest for the object is less than a threshold distance. For example, the low-latency braking system can be configured to determine a distance from the autonomous vehicle to the respective region of interest based on a position of the autonomous vehicle. If the distance from the autonomous vehicle to the region of interest is less than the threshold, the low-latency braking system can be configured to determine that the object has a likelihood of colliding with the autonomous vehicle.

Upon determining that an object has a likelihood of colliding with the autonomous vehicle, the low-latency braking system can implement a braking action to reduce the likelihood the autonomous vehicle will collide with the object. For example, in some implementations, the low-latency braking system can implement a braking action by providing a braking command to a vehicle controller of the autonomous vehicle. The braking command can be, for example, a command to reduce the velocity of the autonomous vehicle. The vehicle controller can be configured to continue controlling the motion of the vehicle subject to the reduced velocity. For example, the vehicle controller can continue to control the autonomous vehicle according to the motion plan at the reduced velocity.

In some implementations, the low-latency braking system can implement a braking action to bring the autonomous vehicle to a complete stop. For example, in some implementations, the low-latency braking system can provide a braking command to a vehicle controller of the autonomous vehicle. The braking command can be, for example, a command to bring the vehicle to a complete stop. The vehicle controller can then bring the vehicle to a complete stop.

In some implementations, the low-latency braking system can override a motion plan provided by the motion planning system. For example, when a vehicle controller receives a braking command from the low-latency braking system, the vehicle controller can be configured to implement the braking command rather than the motion plan. For example, when a braking command is a command to bring the autonomous vehicle to a complete stop, the vehicle controller can bring the vehicle to a complete stop rather than continue to implement the motion plan.

In some implementations, the low-latency braking system can use a plurality of thresholds to determine whether an object has a likelihood of colliding with the autonomous vehicle, and implement a braking action according to which of the plurality of thresholds are met. For example, a first threshold can correspond to a first braking action, and a second threshold can correspond to a second braking action. For example, the first threshold can correspond to a first distance from the autonomous vehicle, and the second threshold can correspond to a second distance from the autonomous vehicle.

For example, the first threshold can be a threshold distance that is less than the second threshold. When the region of interest for an object is closer than the first threshold, the low-latency braking system can be configured to implement a braking action to bring the vehicle to a complete stop. However, when the region of interest for an object is further than the first threshold, but closer than the second threshold, the low-latency braking system can be configured to implement a braking action to reduce the velocity of the autonomous vehicle.

In some implementations, the low-latency braking system can be configured to iteratively determine a region of interest for an object for a plurality of consecutive time frames, and implement a braking action based on the distance to the region of interest for the object at each consecutive time frame. For example, the low-latency braking system can be configured to track an object and respond to the object based on one or more thresholds. For example, in a first time frame, the low-latency braking system can reduce the velocity of the autonomous vehicle when the region of interest for the object is closer than the second threshold distance from the autonomous vehicle. If, at a subsequent time frame, the object is closer than the first threshold distance from the autonomous vehicle, the low-latency braking system can bring the autonomous vehicle to a complete stop.

In this way, the systems and methods according to example aspects of the present disclosure can allow for a low-latency determination that an autonomous vehicle has a likelihood of colliding with an object, and in response to such a determination, implement a braking action to reduce the likelihood of a collision. In particular, by using existing data that is already generated by the vehicle autonomy system, the systems and methods of the present disclosure can allow for quickly determining whether an object in the path of the motion plan of an autonomous vehicle has a likelihood of colliding with the autonomous vehicle without first classifying an object, predicting a trajectory of the object, developing a corresponding motion plan, and controlling the autonomous vehicle according to the motion plan. The ability to rapidly determine whether an object within the path of a previously-determined motion plan poses a threat to the autonomous vehicle can allow for much quicker response times to such objects. In turn, this can allow for an autonomous vehicle to slow down or stop much sooner than would otherwise be possible, thereby reducing the likelihood that a collision will occur and improving passenger and vehicle safety.

Further, by using existing data that is already generated by the vehicle autonomy system rather than generating such data anew, the systems and methods of the present disclosure can allow for computational resources to be used efficiently. For example, by using data that is already generated by the autonomy system and the relatively low-intensity computational methods described herein, the systems and methods of the present disclosure can be implemented on an existing autonomous vehicle computing system with little to no impact on the computing system's ability to perform the vehicle autonomy functions described herein.

The present disclosure also provides additional technical effects and benefits, including, for example, providing a supplemental layer of safety for passengers of an autonomous vehicle. For example, the systems and methods according to example aspects of the present disclosure can be implemented in parallel with existing vehicle autonomy systems, thus allowing for a supplemental safety check and a corresponding layer of redundancy. Thus, as the low-latency systems and methods described herein can work in tandem with existing vehicle autonomy systems, with each responding to objects in the surrounding environment of the autonomous vehicle accordingly, the overall safety for passengers of an autonomous vehicle can be increased.

With reference now to the FIGS., example aspects of the present disclosure will be discussed in further detail. FIG. 1 depicts a block diagram of an example autonomous vehicle 10 according to example aspects of the present disclosure. The autonomous vehicle 10 can include one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 can include one or more processors 112 and a memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly. In some implementations, the perception system 103, the prediction system 104, the motion planning system 105 can be included in or otherwise a part of a vehicle autonomy system. As used herein, the term "vehicle autonomy system" refers to a system configured to control the movement of an autonomous vehicle.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The prediction system 104 can create prediction data associated with each of the respective one or more objects within the surrounding environment of the vehicle 10. The prediction data can be indicative of one or more predicted future locations of each respective object. For example, the prediction data can be indicative of a predicted trajectory (e.g., predicted path) of at least one object within the surrounding environment of the vehicle 10. For example, the predicted trajectory (e.g., path) can indicate a path along which the respective object is predicted to travel over time (and/or the speed at which the object is predicted to travel along the predicted path).

For example, in some implementations, the prediction system 104 can be a goal-oriented prediction system that generates one or more potential goals, selects one or more of the most likely potential goals, and develops one or more trajectories by which the object can achieve the one or more selected goals. For example, the prediction system 104 can include a scenario generation system that generates and/or scores the one or more goals for an object and a scenario development system that determines the one or more trajectories by which the object can achieve the goals. In some implementations, the prediction system 104 can include a machine-learned goal-scoring model, a machine-learned trajectory development model, and/or other machine-learned models.

In some implementations, the predictions system 104 can use state data indicative of an object type or classification to predict a trajectory for the object. As an example, the prediction system 104 can use state data provided by the perception system 103 to determine that particular object (e.g., an object classified as a vehicle) approaching an intersection and maneuvering into a left-turn lane intends to turn left. In such a situation, the prediction system 104 can predict a trajectory (e.g., path) corresponding to a left-turn for the vehicle such that the vehicle turns left at the intersection. Similarly, the prediction system 104 can determine predicted trajectories for other objects, such as bicycles, pedestrians, parked vehicles, etc. The prediction system 104 can provide the predicted trajectories associated with the object(s) to the motion planning system 105.

The motion planning system 105 can determine a motion plan for the autonomous vehicle 10 based at least in part on the predicted trajectories associated with the objects within the surrounding environment of the vehicle and/or the state data for the objects provided by the perception system 103. Stated differently, given information about the current locations of objects and/or predicted trajectories of objects within the surrounding environment of the autonomous vehicle 10, the motion planning system 105 can determine a motion plan for the autonomous vehicle 10 that best navigates the autonomous vehicle 10 relative to the objects at such locations and their predicted trajectories.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion plan can be, for example, a path along which the autonomous vehicle 10 will travel in one or more forthcoming time periods. The motion planning system 105 can provide the selected motion plan to a vehicle controller 106 that controls one or more vehicle controls 107 (e.g., actuators or other devices that control gas flow, steering, braking, etc.) to execute the selected motion plan. In some implementations, the motion planning system 105 can be configured to iteratively update the motion plan for the autonomous vehicle 10 as new sensor data is obtained from one or more sensors 101. For example, as new sensor data is obtained from one or more sensors 101, the sensor data can be analyzed by the perception system 103, the prediction system 104, and the motion planning system 105 to determine the motion plan.

Each of the perception system 103, the prediction system 104, and the motion planning system 105 can be included in or otherwise a part of a vehicle autonomy system configured to determine a motion plan based at least in part on data obtained from one or more sensors 101. For example, data obtained by one or more sensors 101 can be analyzed by each of the perception system 103, the prediction system 104, and the motion planning system 105 in a consecutive fashion in order to develop the motion plan, as described herein. While FIG. 1 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

According to example aspects of the present disclosure, the vehicle computing system 102 can also include a low-latency braking system 150 configured to determine that the autonomous vehicle has a likelihood of colliding with an object in the surrounding environment and, in response, implement a braking action. In some implementations, the low-latency braking system can be implemented by the vehicle computing system 102, and can be configured to operate in parallel with the vehicle autonomy system.

In some implementations, the low-latency braking system can be configured to determine that the autonomous vehicle 10 has a likelihood of colliding with an object in the surrounding environment based at least in part on a motion plan obtained from the vehicle autonomy system. For example, in some implementations, the low-latency braking system 150 can be configured to receive a motion plan from the motion planning system 105 for a forthcoming time period and determine that the autonomous vehicle has a likelihood of colliding with an object in the surrounding environment based at least in part on the motion plan. In some implementations, the low-latency braking system 150 can be configured to receive the most recently-determined motion plan from the motion planning system 105. For example, in some implementations, the motion planning system 105 can be configured to provide a motion plan to the low-latency braking system 150 as soon as the motion planning system 105 has determined the motion plan. In some implementations, the motion planning system 105 can be configured to iteratively update the motion plan as new sensor data is obtained from one or more sensors 101 of the autonomous vehicle 10, and can be configured to provide updated motion plan to the low-latency braking system 150 at each iteration.

In some implementations, the low-latency braking system 150 can be configured to determine that the autonomous vehicle 10 has a likelihood of colliding with an object based at least in part on state data descriptive of the object generated by the vehicle autonomy system.

For example, in some implementations, the low-latency braking system 150 can receive state data generated by the perception system 103 associated with one or more objects within the surrounding environment of the autonomous vehicle 10. As examples, the state data for each object can be descriptive of the object's position, velocity, acceleration, heading, yaw rate, shape, size, type, and/or distance from the autonomous vehicle.

In some implementations, the low-latency braking system 150 can be configured to obtain a subset of the available state data generated by the perception system 103. For example, in some implementations, the perception system 103 can be configured to determine certain state data descriptive of each object before certain other state data. For example, in some implementations, state data descriptive of each object's position, heading, acceleration, velocity and/or distance from the autonomous vehicle can be generated by the perception system 103 before state data descriptive of each object's shape, size, and/or type is generated by the perception system 103.

In some implementations, the low-latency braking system 150 can be configured to obtain state data descriptive of each object's position, heading, acceleration, velocity, and/or distance from the autonomous vehicle 10 when such state data is generated by the perception system 103. For example, the perception system 103 can be configured to provide to the low-latency braking system 150 as the perception system 103 generates the state data for each object.

Figure 2:
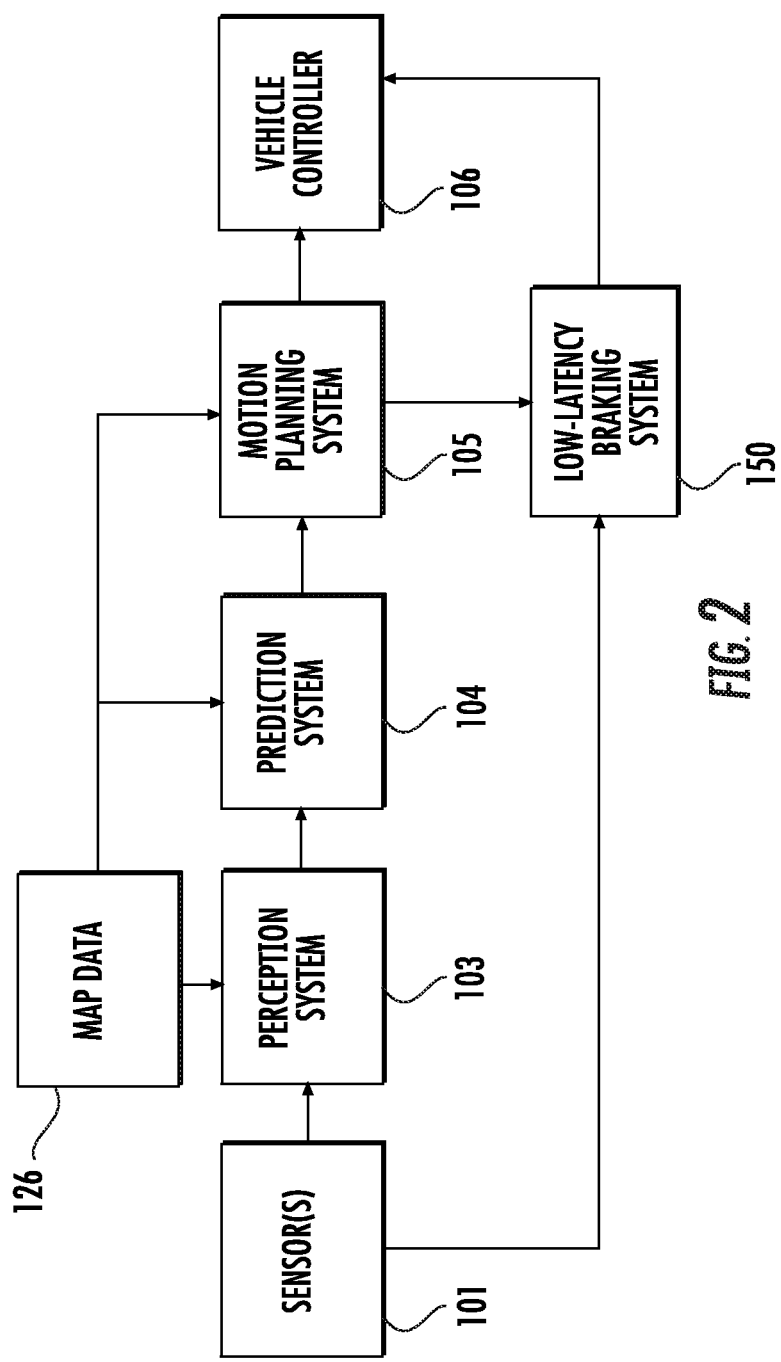
FIG. 2 depicts a block diagram of an example computing system according to example aspects of the present disclosure.

Referring now to FIG. 2, an alternate implementation of a low-latency braking system according to example aspects of the present disclosure is depicted. Elements that are the same or similar to those shown in FIG. 1 are referred to with the same reference numerals. As shown, in some implementations, the low-latency braking system 150 can be configured to obtain sensor data from one or more sensors 101. For example, as new sensor data is obtained from one or more sensors 101 of the autonomous vehicle 10, the sensors 101 can be configured to provide the sensor data to the low-latency braking system 150.

In some implementations, the low-latency braking system 150 can be configured to determine that the autonomous vehicle 10 has a likelihood of colliding with an object based at least in part on the data obtained by the one or more sensors 101. For example, in some implementations, the low-latency braking system 150 can be configured to analyze the sensor data to generate or otherwise determine certain state data descriptive of the object. For example, in some implementations, the low-latency braking system 150 can perform similar analysis as the perception system 103 to generate state data describing the position, velocity, acceleration, and heading for one or more objects sensed by the one or more sensors 101.

Referring now to FIGS. 1 and 2, the low-latency braking system 150 can be configured to implement a braking action for the autonomous vehicle 10 in response to determining that the autonomous vehicle 10 has a likelihood of colliding with an object. For example, in some implementations, the low-latency 150 can provide a braking command to a vehicle controller 106 of the autonomous vehicle 10. In some implementations, the braking command can be, for example, a command to reduce the velocity of the autonomous vehicle 10 or a command to bring the autonomous vehicle 10 to a complete stop. In some implementations, the braking command provided by the low-latency braking system 150 can override the motion plan determined by the motion planning system 105. For example, when a vehicle controller 106 receives a braking command from the low-latency braking system 150, the vehicle controller 106 can be configured to implement the braking command rather than or in addition to the motion plan.

As will be discussed in greater detail with respect to FIGS. 3-5, an advantage provided by the low-latency braking system 150 is the ability to determine that the autonomous vehicle 10 has a likelihood of colliding with an object without first predicting a trajectory of the object. For example, as depicted in FIGS. 1-2, the low-latency braking system 150 can bypass the prediction system 104 to make a determination of whether the autonomous vehicle 10 has a likelihood of colliding with an object. This can allow for a quicker determination that the autonomous vehicle 10 has a likelihood of colliding with the object, thereby allowing for a reduced response time (e.g., faster braking action) to the potential collision.

Each of the perception system 103, the prediction system 104, the motion planning system 105, the vehicle controller 106, and the low-latency braking system 150 can include computer logic utilized to provide desired functionality. In some implementations, each of the perception system 103, the prediction system 104, the motion planning system 105, the vehicle controller 106, and the low-latency braking system 150 can be implemented in hardware, firmware, and/or software controlling a general purpose processor. For example, in some implementations, each of the perception system 103, the prediction system 104, the motion planning system 105, the vehicle controller 106, and the low-latency braking system 150 includes program files stored on a storage device, loaded into a memory and executed by one or more processors. In other implementations, each of the perception system 103, the prediction system 104, the motion planning system 105, the vehicle controller 106, and the low-latency braking system 150 includes one or more sets of computer-executable instructions that are stored in a tangible computer-readable storage medium such as RAM hard disk or optical or magnetic media.

Figure 3:
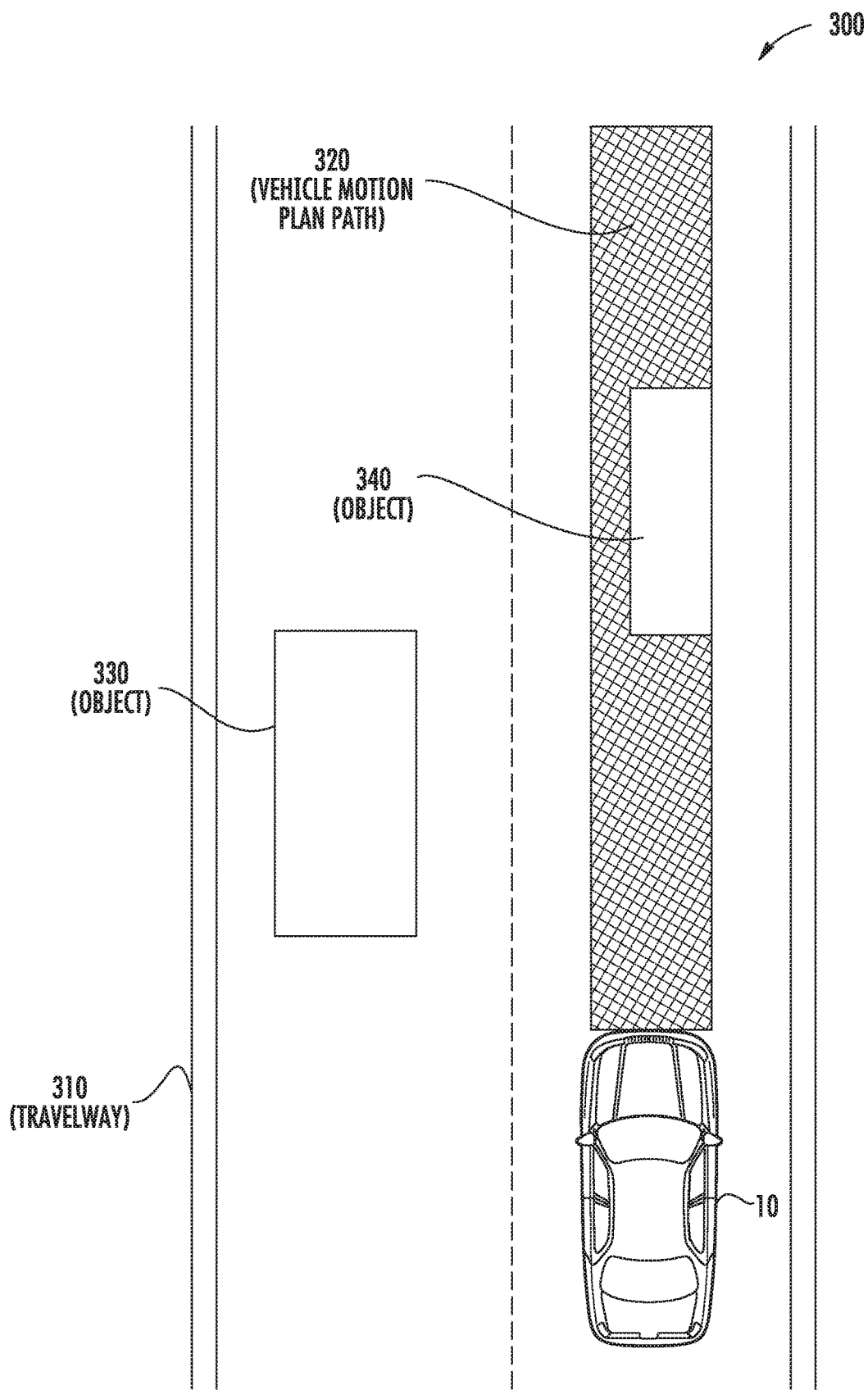
FIG. 3 depicts a diagram of an example environment of an autonomous vehicle according to example aspects of the present disclosure.
Figure 4:
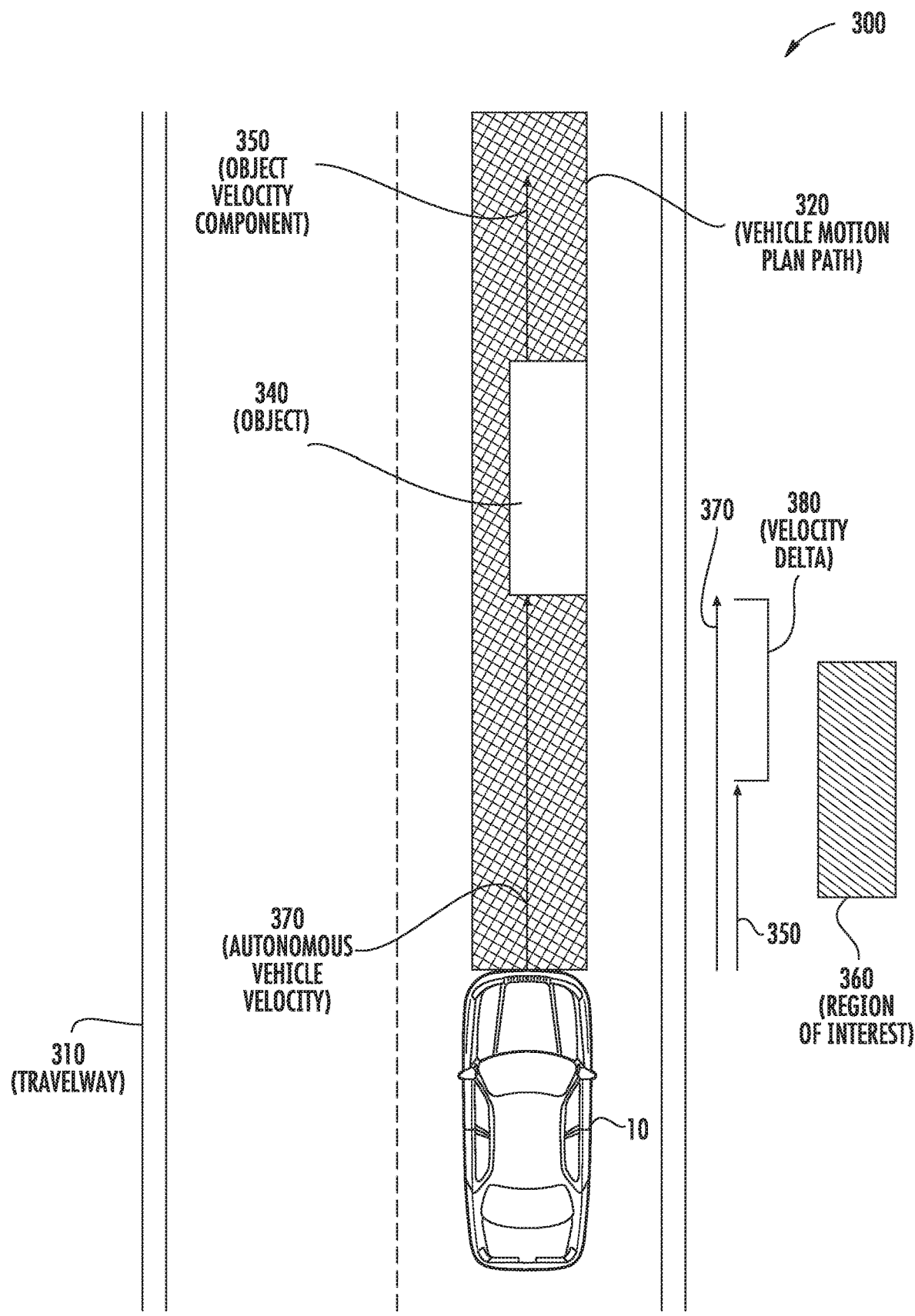
FIG. 4 depicts a diagram of an example environment of an autonomous vehicle according to example aspects of the present disclosure.
Figure 5:
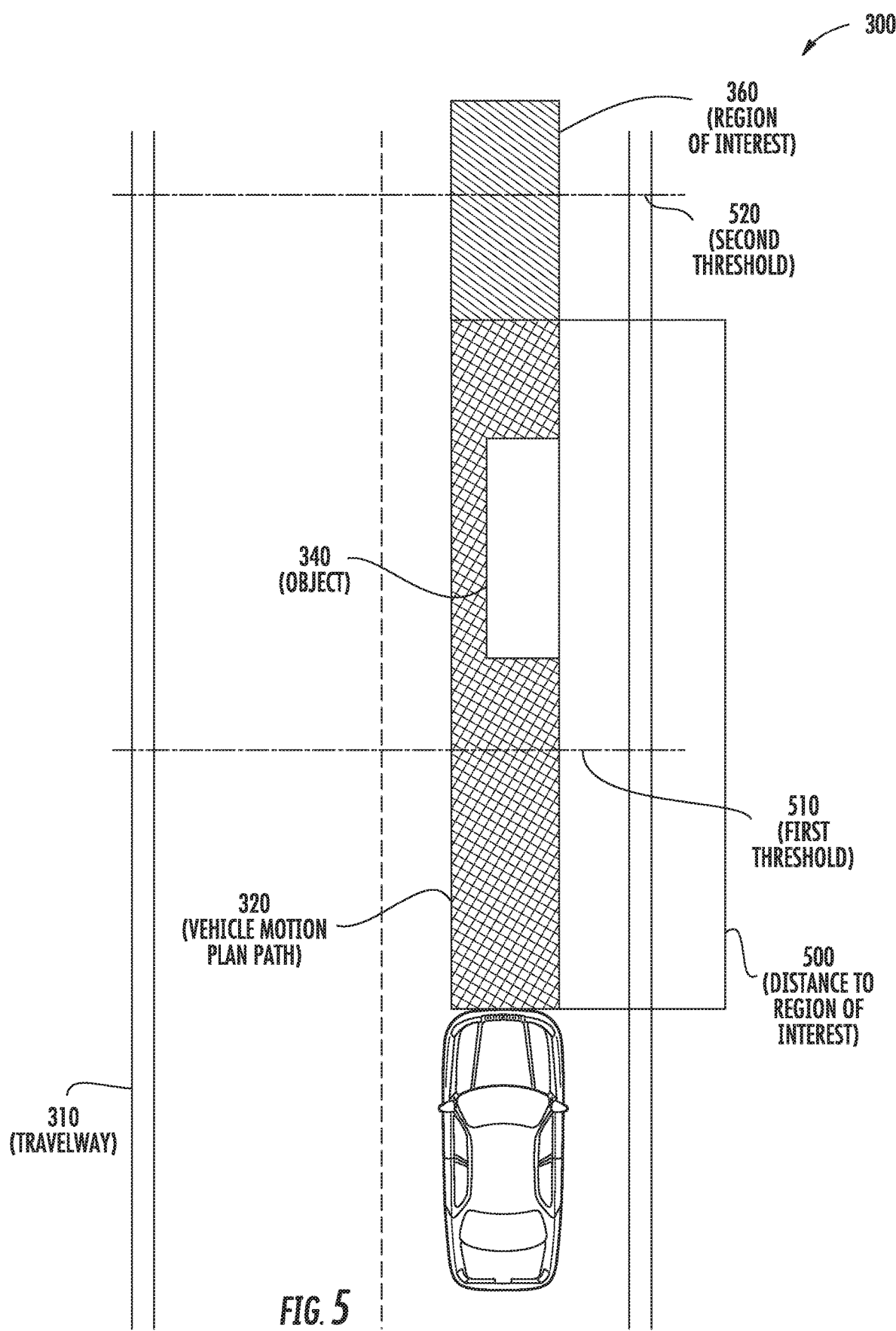
FIG. 5 depicts a diagram of an example environment of an autonomous vehicle according to example aspects of the present disclosure.

Referring now to FIGS. 3-5, an example environment 300 of an autonomous vehicle 10 according to example aspects of the present disclosure is depicted. Further, FIGS. 3-5 depict an example scenario and process by which a low-latency braking system 150 can determine that an autonomous vehicle 10 has a likelihood of colliding with an object.

As shown in FIG. 3, an autonomous vehicle 10 can operate within an environment 300, such as on a travelway 310. For example, as shown, the travelway 310 can be a two-lane roadway. The autonomous vehicle 10 can have previously determined a motion plan using a vehicle autonomy system such as, for example, by a motion planning system 105. A path 320 of the vehicle motion plan can correspond to an area of the environment 300 over which the autonomous vehicle 10 will traverse according to the motion plan for a forthcoming time period.

In some implementations, the low-latency braking system 150 of the autonomous vehicle 10 can be configured to determine that the autonomous vehicle 10 has a likelihood of colliding with an object by determining that the object is within the path 320 of a previously determined motion plan for the autonomous vehicle.

For example, as shown in FIG. 3, two objects 330 and 340 are depicted within the environment 300. As described with respect to FIGS. 1 and 2, the motion planning system 150 can be configured to obtain data associated with the objects 330 and 340 such as, for example, sensor data associated with the objects 330 and 340 from one or more sensors 101 of the autonomous vehicle 10 or state data descriptive of the objects 330 and 340 from a perception system 103. In some implementations, the low-latency braking system can be configured to determine whether an object 330/340 is within the path 320 of the motion plan based on a position of each object 330/340. For example, state data descriptive of the object 330/340 can include data descriptive of the position of the object 330/340, which can be mapped onto the environment 300. In this way, the low-latency braking system 150 can be configured to determine whether an object 330/340 is within the path 320 of the motion plan. For example, as shown, the object 330 is not within the path 320 of the motion plan, while the object 340 is within the path 320 of the motion plan.

In some implementations, the low-latency braking system 150 can be configured to determine whether an object 330/340 is within the path 320 of the motion plan without classifying the object 330/340. For example, a perception system 103 of the autonomous vehicle 10 can be configured to classify each object perceived by the perception system 103 (e.g., tree, vehicle, pedestrian, bicycle, etc.). The low-latency braking system 150, however, can be configured to determine whether an object 330/340 is within the path 320 of the motion plan without first classifying the object (i.e., without determining an object type). For example, as long as an object 330/340 is within the path 320 of the motion plan, the low-latency braking system 150 can be configured to perform additional analysis on the object 330/340 to determine whether the autonomous vehicle 10 has a likelihood of colliding with the object 330/340.

An advantage provided by omitting object classification in the analysis of the low-latency braking system 150 is that the time required for object classification analysis can be eliminated, thereby further reducing the latency of the low-latency braking system 150. This, in turn, can allow for reduced response times to objects 330/340 within the path 320 of the motion plan of the autonomous vehicle 10. For example, the low-latency braking system 150 can implement a braking action to prevent a collision with the object 330/340, and can do so without first determining whether the object 330/340 is a vehicle, tree, or any other object type.

In some implementations, objects 330/340 determined to be within the path 320 of the motion plan can be selected for additional analysis, while objects 330/340 determined to not be within the path 320 the motion plan can be disregarded for additional analysis. For example, object 340 can be selected for additional analysis, while object 330 can be disregarded.

Referring now to FIG. 4, the example environment 300 of FIG. 3 is depicted, further showing additional analysis according to example aspects of the present disclosure. Elements that are the same or similar to those shown in FIG. 3 are referred to with the same reference numerals.

As shown, the low-latency braking system 150 can be configured to perform additional analysis on object 340. For example, in some implementations, the low-latency braking system 150 can be configured to determine that the autonomous vehicle 10 has a likelihood of colliding with the object 340 by determining a longitudinal velocity component 350 for the object 340 along the path 320 of the previously determined motion plan. For example, as described herein, the low-latency braking system 150 can be configured to receive and/or generate state data describing the velocity and/or heading of the object.

The longitudinal velocity component 350 of the object 340 can correspond to the velocity component of the object 340 along the planned direction of travel of the autonomous vehicle 10. In some implementations, the velocity of an object can be represented as a vector including both a magnitude and a direction (i.e., a heading). In some implementations, the magnitude of the velocity and the heading of the object can be represented as separate quantities. In some implementations, the low-latency braking system 150 can be configured to determine a longitudinal velocity component 350 for the object 340 along the motion path 320 by, for example, by performing a vector analysis on the state data for the object 340 to determine a magnitude of the longitudinal velocity component 350 in the planned direction of travel of the autonomous vehicle 10. In other implementations, the low-latency braking system can be configured to determine a longitudinal velocity component 350 for an object 340 using any suitable means.

The low-latency braking system 150 can further be configured to determine a region of interest 360 based on the longitudinal velocity component 350 for the object 340 and the velocity 370 of the autonomous vehicle 10. For example, as depicted in FIG. 4, the longitudinal velocity component 350 of the object 340 and the velocity 370 of the autonomous vehicle 10 along the path 320 of the motion plan are both represented as vector arrows travelling in the same direction. A velocity delta 380, or difference between the longitudinal velocity component 350 and the autonomous vehicle velocity 370, can then be determined by the low-latency braking system 150. The region of interest 360 can then be determined based on the velocity delta 380. The region of interest 360 can correspond to a portion of the path 320 of the motion plan for the autonomous vehicle 10 in which the object 340 and the autonomous vehicle 10 overlap with one another (i.e., collide) based on their respective velocities 350 and 370.

For example, for an object 340 travelling at the same velocity 350 as the velocity 370 of the autonomous vehicle 10, the velocity delta 380 will be zero. In such a case, the region of interest 360 will be non-existent, as there will be no projected overlap on the path 320 of the motion plan. Similarly, for objects 340 which are traveling faster than the autonomous vehicle 10, the region of interest 360 will be zero, as the autonomous vehicle 10 will not be projected to overtake the object 340. Similarly, for objects 340 which are moving out of the path 320 of the motion plan, the region of interest may be zero, as the object 340 may have moved out of the path 320 of the motion plan by the time the autonomous vehicle 10 would reach the object 340. However, for an object 340 that is stationary, travelling at a velocity 350 towards the autonomous vehicle 10, or travelling at a velocity 350 slower than the velocity 370 of the autonomous vehicle 10 along the path 320 of the motion plan, the region of interest 360 can be determined and plotted on the path 320 of the motion plan.

For example, referring now to FIG. 5, an example region of interest 360 corresponding to a portion of the path 320 of the motion plan of the autonomous vehicle 10 in which the autonomous vehicle 10 and the object 340 are likely to collide is depicted. Elements that are the same or similar to those in FIGS. 3 and 4 are referred to with the same reference numerals.

In some implementations, the low-latency braking system 150 can be configured to determine that the autonomous vehicle 10 and the object 340 are likely to collide when an estimated distance 500 from the autonomous vehicle 10 to the region of interest 360 for the object 340 is less than a threshold. For example, the low-latency braking system 150 can be configured to determine a distance 500 from the autonomous vehicle 10 to region of interest 360 based on a position of the autonomous vehicle 10 and the location of the region of interest 360 on the path 320 of the motion plan. If the distance 500 from the autonomous vehicle 10 to the region of interest 360 is less than the threshold, the low-latency braking system 150 can be configured to determine that the autonomous vehicle 10 has a likelihood of colliding with the object 340. In response to determining that the autonomous vehicle 10 and the object 340 are likely to collide, the low-latency braking system 150 can implement a braking action.

For example, as shown in FIG. 5, a first threshold 510 and a second threshold 520 are depicted. In some implementations, the first threshold 510 and second threshold 520 can correspond to different braking actions which can be implemented by the low-latency braking system 150.

For example, a first threshold 510 can correspond to a braking action in which the autonomous vehicle 10 is brought to a complete stop. If the distance 500 from the autonomous vehicle 10 to the region of interest 360 is less than the first threshold 510, the low-latency braking system 150 can be configured to implement a braking action by bringing the autonomous vehicle 10 to a complete stop. For example, the low-latency braking system 150 can send a braking command to a vehicle controller 106 to bring the vehicle to a complete stop rather than continue to follow the previously-determined motion plan.

A second threshold 520 can correspond to a braking action in which the low-latency braking system 150 reduces a velocity of the autonomous vehicle 10. If the distance 500 from the autonomous vehicle 10 to the region of interest 360 is less than the second threshold 520, the low-latency braking system 150 can be configured to implement a braking action by reducing the velocity of the autonomous vehicle 10. For example, the low-latency braking system 150 can send a braking command to a vehicle controller 106 to reduce the velocity of the autonomous vehicle 10, while still adhering to the path 320 of the motion plan. For example, the braking command can reduce the velocity of the autonomous vehicle 10 from a first velocity (e.g., 30 mph) to a second velocity (e.g., 20 mph).

In some implementations, the low-latency braking system 150 can use any number of thresholds 510/520 corresponding to various braking actions. For example, a plurality of thresholds 510/520 can be used to reduce the velocity of the autonomous vehicle 10 by different amounts. For example, in some implementations, as the distance 500 from the autonomous vehicle 10 to the region of interest 360 is reduced, various thresholds 510/520 can be used to more aggressively brake (i.e., more quickly reduce the velocity) of the autonomous vehicle 10.

In some implementations, the low-latency braking system 150 can be configured to reduce the velocity of the autonomous vehicle 10 for a forthcoming time period, and subsequently bring the vehicle to a complete stop. For example, as shown in FIG. 5, the distance 500 to the region of interest 360 is less than the second threshold 520, but greater than the first threshold 510. In such a situation, the low-latency braking system 150 can be configured to reduce the velocity of the autonomous vehicle 10 for a forthcoming time period. For example, the autonomous vehicle 10 can continue traversing the path 320 of the motion plan for a forthcoming time period (e.g., 100 ms) at a reduced velocity. The low-latency braking system 150 can perform a subsequent analysis to determine a new region of interest 360 for the object 340 as new sensor data, state data, and/or motion plans become available (e.g., from sensors 101 or the vehicle autonomy system). Following the subsequent analysis, if the distance 500 to the new region of interest 360 is less than first threshold 510, the low-latency braking system 150 can implement a second braking action such as, for example, bringing the autonomous vehicle 10 to a complete stop.

Additionally, in some implementations, the low-braking system 150 can be configured to determine a respective region of interest 360 for each object 340 with in the path 320 of the motion plan. For example, a plurality of objects 330/340 may be located within the path 320 of the motion plan for the autonomous vehicle 10. The low-latency braking system 150 can be configured to determine a respective region of interest 360 for each of the objects 330/340 within the path 320 of the motion plan, determine a respective distance 500 to each respective region of interest 360, and implement a braking action if the distance 500 to a region of interest 360 for any of the objects is less than one or more thresholds 510/520.

In some implementations, the low-latency braking system 150 can be configured to implement the most aggressive braking action based on the respective distances 500 to the respective regions of interest 360 for a plurality of objects 330/340. For example, if the distance 500 to the region of interest 360 for a first object 330 is less than a second threshold 520 corresponding to a braking action to reduce a velocity, whereas the distance 500 to a region of interest 360 for a second object 340 is less than a first threshold 510 corresponding to a braking action to bring the autonomous vehicle 10 to a complete stop, the low-latency braking system 150 can be configured to implement a braking action to bring the autonomous vehicle 10 to a complete stop.

As noted, the low-latency braking system 150 according to example aspects of the present disclosure can be configured to implement a braking action without predicting a trajectory of the object 330/340 in the surrounding environment 300. For example, the low-latency braking system 150 can simply check whether an object 330/340 located within the path 320 of previously-determined motion plan has a likelihood of colliding with the autonomous vehicle 10 based on the position and velocity of the object 330/340. This can reduce the time required to perform such a determination as compared to the vehicle autonomy system, and further can be performed in parallel with the vehicle autonomy system, thereby providing a supplemental layer of safety.

Additionally, in some implementations, the low-latency braking system 150 can perform this supplemental check without waiting for an object 330/340 to be classified (i.e., a type of the object to be determined). This can further reduce the time required to perform such a determination, allowing for even quicker response times. Further, in some implementations, data which is already generated by the vehicle autonomy system can be used by the low-latency braking system 150 (e.g., previously determined motion plans and state data), thereby allowing for computational resources on an autonomous vehicle 10 to be used efficiently.

Figure 6:
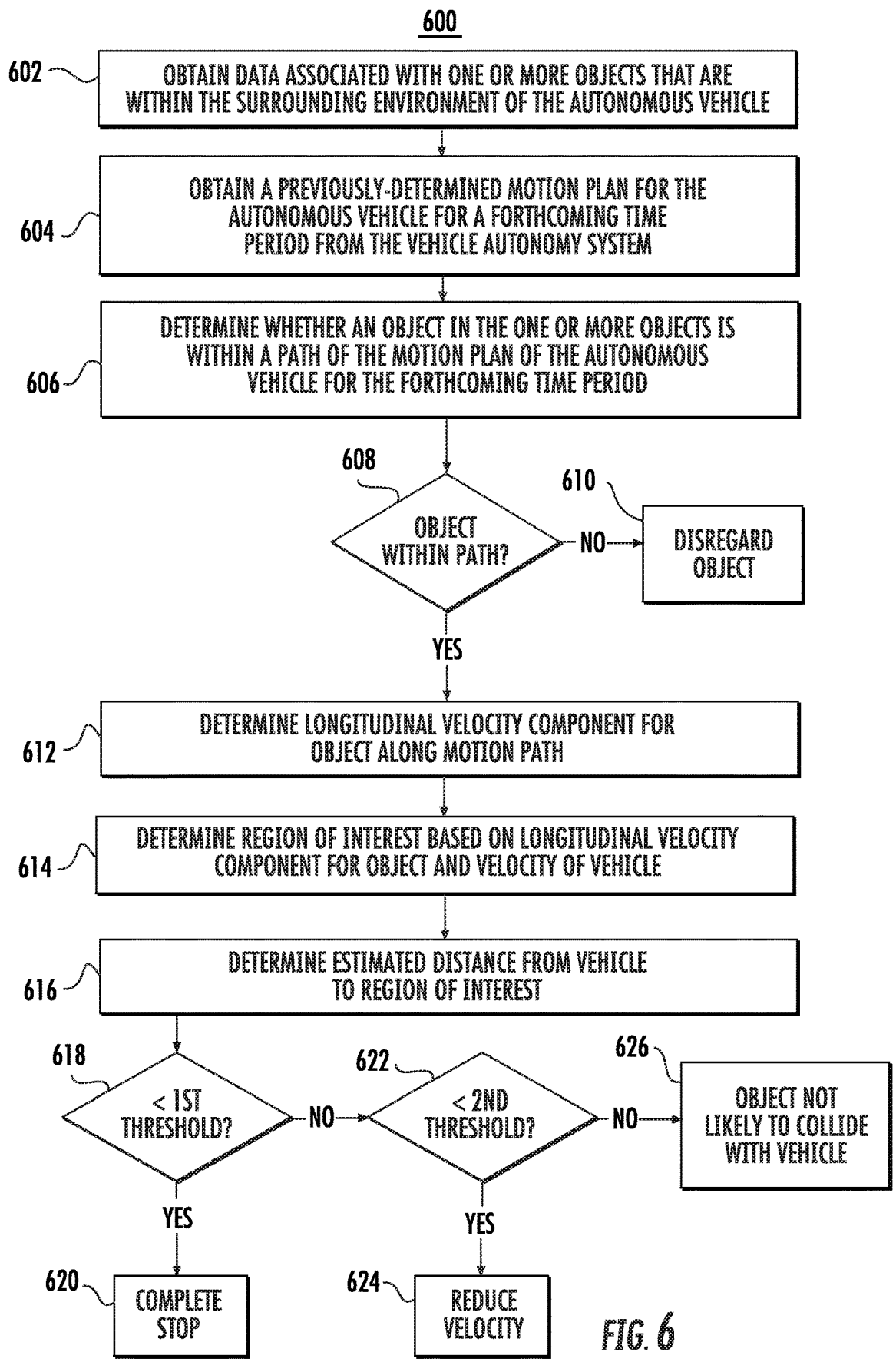
FIG. 6 depicts a flow diagram of an example method for implementing a low-latency braking action according to example aspects of the present disclosure.

Referring now to FIG. 6, an example method (600) to implement a braking action in response to determining an autonomous vehicle has a likelihood of colliding with an object according to example aspects of the present disclosure is depicted. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure. The method (600) can be implemented by a computing system, such as a computing system comprising one or more processors.

At (602), the method (600) can include obtaining data associated with one or more objects that are within the surrounding environment of the autonomous vehicle. For example, in some implementations, the computing system can obtain state data descriptive of one or more objects perceived by an autonomous vehicle from a vehicle autonomy system, such as a perception system 103. In some implementations, the data associated with one or more objects can be obtained from one or more sensors 101 of the autonomous vehicle 10.

At (604), the method (600) can include obtaining a previously-determined motion plan for the autonomous vehicle for a forthcoming time period from the vehicle autonomy system. For example, the computing system can obtain a motion plan from a motion planning system 105 of an autonomous vehicle 10, such as the most recently determined motion plan.

At (606), the method (600) can include determining that the autonomous vehicle has a likelihood of colliding with an object in the one or more objects perceived by the autonomous vehicle based at least in part on the previously-determined motion plan and the respective state data descriptive of the object. For example, the computing system can first determine whether an object 330/340 in the one or more objects 330/340 is within a path 320 of the motion plan of the autonomous vehicle 10 for the forthcoming time period. For example, the state data descriptive of an object 330/340 can include an object's position, which can be mapped onto a path 320 of the motion plan for the autonomous vehicle 10.

At (608), the method (600) can include determining whether the object is within the path of the motion plan. For example, an object 330/340 which is located within the path 320 can be selected for additional analysis, whereas at (610) an object 330/340 which is not located within the path 320 of the motion plan can be disregarded.

At (612) the method (600) can include determining a longitudinal velocity component for the object along the motion path. For example, the velocity of the object 330/340 can be represented as a vector with a magnitude and direction, and the longitudinal velocity component 350 can represent the velocity of the object 330/340 along the motion path 320.

At (614) the method (600) can include determining a region of interest based on the longitudinal velocity component for the object and a velocity of the vehicle. For example, the region of interest 360 can correspond to a portion of the path 320 of the motion plan in which the object 330/340 and the autonomous vehicle 10 overlap with one another (i.e., collide).

At (616), the method (600 can include determining an estimated distance from the autonomous vehicle to the region of interest. For example, based on a position of the autonomous vehicle 10 relative to the region of interest 360, the computing system can determine an estimated distance 500 from the autonomous vehicle 10 to the region of interest 360.

If the distance from the autonomous vehicle to the region of interest is less than a threshold, the computing system can determine that the autonomous vehicle and the object are likely to collide. For example, at (618), the computing system can determine whether the estimated distance 500 from the autonomous vehicle 10 to the region of interest 360 is less than the first threshold 510. If so, at (620), the computing system can implement a braking action to reduce the likelihood that the autonomous vehicle 10 will collide with the object 330/340 by bringing the autonomous vehicle 10 to a complete stop.

If at (618), the distance 500 from the autonomous vehicle 10 to the region of interest 360 is not less than the first threshold 510, the computing system can check whether the distance 500 from the autonomous vehicle 10 to the region of interest 360 is less than a second threshold 520. If so, at (624) the computing system can implement a braking action to reduce the likelihood that the autonomous vehicle 10 will collide with the object 330/340 by reducing the velocity of the autonomous vehicle 10. If, at (622), the computing system determines that the distance 500 from the autonomous vehicle 10 to the region of interest 360 is not less than the second threshold 520, then at (626) the computing system can determine that the object 330/340 is not likely to collide with the autonomous vehicle 10.

In this way, the systems and methods according to example aspects of the present disclosure can allow for implementing a low-latency braking action for an autonomous vehicle in response to determining an object has a likelihood of colliding with the autonomous vehicle.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
a vehicle autonomy system comprising one or more processors, the vehicle autonomy system configured to:
obtain first sensor data from one or more sensors of an autonomous vehicle;
analyze the first sensor data to perceive one or more first objects in the surrounding environment of the autonomous vehicle;
determine a first predicted trajectory for at least one of the one or more first perceived objects;
implement a first motion plan for the autonomous vehicle based at least in part on the first predicted trajectory for the at least one of the one or more first perceived objects, the first motion plan indicative of a path along which the autonomous vehicle will travel for one or more forthcoming time periods;
obtain second sensor data from the one or more sensors, the second sensor data obtained subsequent to the first sensor data;
analyze the second sensor data to perceive one or more second objects in the surrounding environment of the autonomous vehicle;
determine a second predicted trajectory for at least one of the one or more second perceived objects; and
implement a second motion plan for the autonomous vehicle based at least in part on the second predicted trajectory for the at least one of the one or more second perceived objects, the second motion plan comprising an updated motion plan from the first motion plan; and
a low-latency braking system comprising one or more processors, wherein the low-latency braking system is configured to:
obtain, from the vehicle autonomy system, the first motion plan;
obtain the second sensor data from the one or more sensors or state data generated by the vehicle autonomy system based at least in part on the second sensor data;
in parallel with the vehicle autonomy system determining the second motion plan based on the second sensor data, perform a supplementary safety check to determine that the autonomous vehicle has a likelihood of colliding with at least one of the one or more second objects based at least in part on the first motion plan and at least one of the second sensor data or the state data; and in response to determining that the autonomous vehicle has the likelihood of colliding with the at least one of the one or more second objects, implement a braking action for the autonomous vehicle;

wherein the braking action implemented by the low-latency braking system has a lower latency to perform than the second motion plan implemented by the vehicle autonomy system.

2. The computing system of claim 1, wherein the state data generated by the vehicle autonomy system based at least in part on the second sensor data comprises one or more of: a position, a velocity, an acceleration, a heading, a yaw rate, a shape, a size, a type, and a distance from the autonomous vehicle.

3. The computing system of claim 1, wherein the low-latency braking system is configured to determine that the autonomous vehicle has the likelihood of colliding with the at least one of the one or more second objects by determining that the at least one of the one or more second objects is within a path of the first motion plan for the autonomous vehicle without classifying the at least one of the one or more second objects.

4. The computing system of claim 3, wherein when the at least one of the one or more second objects is within the path of the previously determined motion plan for the autonomous vehicle, the low-latency braking system is further configured to determine that the autonomous vehicle has the likelihood of colliding with the at least one of the one or more second objects by determining a longitudinal velocity component for the at least one of the one or more second objects along the path of the first motion plan.

5. The computing system of claim 4, wherein the low-latency braking system is further configured to determine that the autonomous vehicle has the likelihood of colliding with the at least one of the one or more second objects by determining a region of interest based on the longitudinal velocity component for the and a velocity of the autonomous vehicle.

6. The computing system of claim 5, wherein the low-latency braking system is further configured to determine that the autonomous vehicle has the likelihood of colliding with the at least one of the one or more second objects when an estimated distance from the autonomous vehicle to the region of interest for the at least one of the one or more second objects is less than a threshold.

7. The computing system of claim 6, wherein when the estimated distance from the autonomous vehicle to the region of interest for the at least one of the one or more second objects is less than the threshold, the low-latency braking system is configured to implement the braking action by reducing the velocity of the autonomous vehicle for a forthcoming time period.

8. The computing system of claim 6, wherein when the estimated distance from the autonomous vehicle to the region of interest for the at least one of the one or more second objects is less than the threshold, the low-latency braking system is configured to implement the braking action by bringing the autonomous vehicle to a complete stop.

9. The computing system of claim 1, wherein the low-latency braking system is configured to implement the braking action by providing a braking command to a vehicle controller of the autonomous vehicle.

10. The computing system of claim 1, wherein the vehicle autonomy system is configured to determine the second motion plan by predicting a trajectory of the at least one of the one or more second objects; and wherein the low-latency braking system is configured to implement the braking action without predicting the trajectory of the at least one of the one or more second objects.

11. The computing system of claim of claim 1, wherein the computing system comprises a computing system onboard the autonomous vehicle.

12. A computer-implemented method, comprising:

obtaining, by a vehicle autonomy system of an autonomous vehicle, first sensor data from one or more sensors of the autonomous vehicle, the vehicle autonomy system comprising one or more processors;

analyzing b the vehicle autonomy system, the first sensor data to perceive one or more first objects in the surrounding environment of the autonomous vehicle;

determining, by the vehicle autonomy system, a first predicted trajectory for at least one of the one or more first perceived objects;

determining, by the vehicle autonomy system, a first motion plan for the autonomous vehicle based at least in part on the first predicted trajectory for the at least one of the one or more first perceived objects, the first motion plan indicative of a path along which the autonomous vehicle will travel for one or more forthcoming time periods, obtaining, by the vehicle autonomy system, second sensor data from the one or more sensors;

determining, by the vehicle autonomy system, state data descriptive of one or more objects perceived by the autonomous vehicle based at least in part on the second sensor data;

obtaining, by a low-latency braking system comprising one or more processors, the state data descriptive of the one or more objects perceived by the autonomous vehicle from the vehicle autonomy system;

obtaining; by the low-latency braking system, the first motion plan for the autonomous vehicle from the vehicle autonomy system;

determining, by the vehicle autonomy system, a second motion plan based at least in part on the state data descriptive of the one or more objects perceived by the autonomous vehicle;

while the vehicle autonomy system is determining the second motion plan, performing by the low-latency braking system; a supplementary safety check to determine that the autonomous vehicle has a likelihood of colliding with an object in the one or more objects perceived by the autonomous vehicle based at least in part on the first motion plan and the respective state data descriptive of the object; and in response to determining that the autonomous vehicle has the likelihood of colliding with the object, implementing, by the low-latency braking system, a braking action to reduce the likelihood that the autonomous vehicle will collide with the object;

wherein the braking action implemented by the low-latency braking system has a lower latency to perform than the second motion plan determined by the vehicle autonomy system.

13. The computer-implemented method of claim 12, wherein the state data descriptive of the one or more objects perceived by the autonomous vehicle comprises, for each object, one or more of: a position, a velocity, an acceleration, a heading, a yaw rate, a shape, a size, a type, and a distance from the autonomous vehicle.

14. The computer-implemented method of claim 12, wherein performing, by the low-latency braking system, the supplementary safety check to determine that the autonomous vehicle has a likelihood of colliding with the object based at least in part on the first motion plan and the respective state data descriptive of the object comprises:
    determining, by the low-latency braking system, that the object is within a path of the first motion plan of the autonomous vehicle for the forthcoming time period without classifying the object.

15. The computer-implemented method of claim 14, wherein performing, by the low-latency braking system, the supplementary safety check to determine that the autonomous vehicle has a likelihood of colliding with the object based at least in part on the first motion plan and the respective state data descriptive of the object further comprises:
    determining, by the low-latency braking system, a region of interest for the object based at least in part on a longitudinal velocity component for the object along the path of the first motion plan and a velocity of the autonomous vehicle.

16. The computer-implemented method of claim 15, wherein performing, by the low-latency braking system, the supplementary safety check to determine that the autonomous vehicle has a likelihood of colliding with the object based at least in part on the first motion plan and the respective state data descriptive of the object further comprises:
    determining, by the low-latency braking system, that the region of interest for the object is less than a threshold distance from the autonomous vehicle.

17. The computer-implemented method of claim 16,
    wherein, when the distance from the autonomous vehicle to the region of interest for the object is less than a first threshold,
    implementing, by the low-latency braking system, the braking action to reduce the likelihood that the autonomous vehicle will collide with the object comprises bringing the autonomous vehicle to a complete stop; and
    wherein, when the distance from the autonomous vehicle to the region of interest for the object is greater than the first threshold and less than a second threshold,
    implementing, by the low-latency braking system, the braking action to reduce the likelihood that the autonomous vehicle will collide with the object comprises reducing the velocity of the autonomous vehicle.

18. An autonomous vehicle, comprising:
    a vehicle autonomy system comprising one or more processors, the vehicle autonomy system configured to:
        obtain first sensor data from one or more sensors of an autonomous vehicle;
        analyze the first sensor data to perceive one or more first objects in the surrounding environment of the autonomous vehicle;
        determine a first predicted trajectory for at least one of the one or more first perceived objects;
        implement a first motion plan for the autonomous vehicle based at least in part the first predicted trajectory for the at least one of the one or more first perceived objects, the first motion plan indicative of a path along which the autonomous vehicle will travel for one or more forthcoming time periods,
        obtain second sensor data from the one or more sensors, the second sensor data obtained subsequent to the first sensor data;
        analyze the second sensor data to perceive one or more second objects in the surrounding environment of the autonomous vehicle;
        determine a second predicted trajectory for at least one of the one or more second perceived objects; and
        implement a second motion plan for the autonomous vehicle based at least in part on the second predicted trajectory for the at least one of the one or more second perceived objects, the second motion plan comprising an updated motion plan from the first motion plan; and
    a low-latency braking system comprising one or more processors, wherein the low-latency braking system is configured to:
        obtain, from the vehicle autonomy system, the first motion plan;
        obtain the second sensor data from the one or more sensors or state data generated by the vehicle autonomy system based at least in part on the second sensor data;
        in parallel with the vehicle autonomy system determining the second motion plan based on the second sensor data, perform a supplementary safety check to determine that the autonomous vehicle has a likelihood of colliding with at least one of the one or more second objects based at least in part on the first motion plan and at least one of the second sensor data or the state data; and
        in response to determining that the autonomous vehicle has the likelihood of colliding with the at least one of the one or more second objects, implement a braking action for the autonomous vehicle;
        wherein the braking action implemented by the low-latency braking system has a lower latency to perform than the second motion plan implemented by the vehicle autonomy system.

* * * * *